United States Patent
Derscheid et al.

(10) Patent No.: US 11,871,702 B2
(45) Date of Patent: Jan. 16, 2024

(54) BALE IDENTIFICATION SYSTEM AND METHOD

(71) Applicant: DEERE & COMPANY, Moline, IL (US)

(72) Inventors: Daniel E. Derscheid, Hedrick, IA (US); Kyle R. Teach, Ottumwa, IA (US); Gerald W. Shook, Des Moines, IA (US); Robert V. Weinmann, Wahpeton, ND (US); Nathan J. Yost, Blackfoot, ID (US)

(73) Assignee: DEERE & COMPANY, Moline, IL (US)

( * ) Notice: Subject to any disclaimer, the term of this patent is extended or adjusted under 35 U.S.C. 154(b) by 674 days.

(21) Appl. No.: 17/076,991

(22) Filed: Oct. 22, 2020

(65) Prior Publication Data

US 2022/0124984 A1    Apr. 28, 2022

(51) Int. Cl.
*A01F 15/14* (2006.01)
*A01F 15/07* (2006.01)
*G06K 7/10* (2006.01)

(52) U.S. Cl.
CPC .......... *A01F 15/145* (2013.01); *A01F 15/071* (2013.01); *A01F 2015/076* (2013.01); *G06K 7/10425* (2013.01)

(58) Field of Classification Search
CPC .......................... A01F 15/145; A01F 2015/076
See application file for complete search history.

(56) References Cited

U.S. PATENT DOCUMENTS

| | | | |
|---|---|---|---|
| 10,276,015 B2 * | 4/2019 | Lang | A01F 15/14 |
| 10,292,335 B2 | 5/2019 | Verhaeghe et al. | |
| 10,303,997 B2 | 5/2019 | Hamilton et al. | |
| 10,492,371 B2 | 12/2019 | Hamilton et al. | |
| 10,657,433 B2 | 5/2020 | Hamilton et al. | |
| 2017/0057680 A1 * | 3/2017 | Schlichting | G06K 7/10425 |
| 2017/0287303 A1 * | 10/2017 | Lang | G08B 21/0275 |
| 2018/0260674 A1 * | 9/2018 | Hamilton | G06K 19/0723 |
| 2018/0260675 A1 * | 9/2018 | Hamilton | G06Q 50/02 |
| 2020/0074262 A1 | 3/2020 | Hamilton et al. | |

(Continued)

FOREIGN PATENT DOCUMENTS

| | | |
|---|---|---|
| EP | 3147229 A1 | 3/2017 |
| EP | 3228180 B1 | 9/2019 |
| WO | WO2018164980 A1 | 9/2018 |

OTHER PUBLICATIONS

Extended European Search Report and Written Opinion issued in European Patent Application No. 21203312.0, dated Mar. 7, 2022, in 07 pages.

*Primary Examiner* — Shaun R Hurley

(57) ABSTRACT

A baler implement a tag installer operable to attach an RFID identification tag to a bale. A reader is positioned to interrogate the identification tag for receiving data from the identification tag. The reader is operable to emit an interrogation signal for interrogating the identification tag in accordance with a pre-defined timing sequence. The reader emits the interrogation signal regardless of a position of the bale in the baling chamber or on the baler implement. As such, the interrogation signal is emitted based on the pre-defined timing sequence. The pre-defined timing sequence may include a repeated on/off interrogation sequence, or continuously scanning interrogation sequence.

18 Claims, 5 Drawing Sheets

(56) References Cited

U.S. PATENT DOCUMENTS

2020/0128754 A1    4/2020  Hamilton et al.
2021/0127589 A1*  5/2021  Hamilton ............ A01F 15/0875
2022/0124985 A1*  4/2022  Kraus .................. A01F 15/145

* cited by examiner

BALE IDENTIFICATION SYSTEM AND METHOD

TECHNICAL FIELD

The disclosure generally relates to a baler implement having a bale identification system for identifying and tracking data related to a bale of crop material, and a method of identifying and tracking data related to a bale of crop material.

BACKGROUND

Agricultural baler implements gather, compress, and shape crop material into a bale. There are different types of baler implements that create bales. One type of baler implement is often referred to as a square baler implement or a large square baler implement, which produces bales having a rectangular or square shaped. These square bales may be referred to as parallelepiped shaped bales. Another type of baler implement is often referred to as a round baler implement, which produces a bale having a round or cylindrical shape.

The bales are formed from crop material and have or exhibit characteristics or properties of the bale and/or the crop material. For example, each bale may exhibit a respective weight, moisture content, material content, ash content, location, etc. Bale producers may desire to identify and track one or more of the characteristics or properties of each respective bale, so that this information may be accurately communicated to an end user or purchaser of that respective bale.

SUMMARY

A baler implement is provided. The baler implement includes a housing defining a baling chamber for forming crop material into a bale. The baler implement includes a bale identification system, which includes a tag installer, a reader, and a baler implement controller. The tag installer is operable to attach an identification tag to the bale. The reader is positioned to interrogate the identification tag for receiving data from the identification tag. The reader is operable to emit an interrogation signal in accordance with a pre-defined timing sequence.

In one aspect of the disclosure, the reader emits the interrogation signal regardless of a position of the bale in the baling chamber. As such, the interrogation signal is emitted based on the pre-defined timing sequence. As such, movement of the bale and/or a position of the bale does not activate or otherwise trigger the reader to emit the interrogation signal.

In one implementation of the disclosure, the pre-defined timing sequence includes continuously emitting the interrogation signal. In another implementation of the disclosure, the pre-defined timing sequence includes emitting the interrogation signal in a continuous cycle. The continuous cycle includes a pre-defined scan period followed by a pre-defined non-scan period. The interrogation signal is emitted during the scan period and is not emitted during the non-scan period. Each of the scan period and the non-scan period last for a pre-defined duration of time. The sequence of the scan period followed by the non-scan period is continuously repeated in a cyclical manner to define the pre-defined timing sequence.

In one implementation of the disclosure, the tag installer includes a knotter system. The knotter system is operable to wrap the bale with a twine. The identification tag may be attached to the twine, woven into the twine, or positioned under and held in place by the twine. In other implementations, the tag installer may be separate from the knotter system and/or the twine. For example, the tag installer may include a net wrap system that wraps the bale with a net wrap material, such as but not limited to a plastic wrap or a mesh wrap. The identification tag may be attached to the net wrap wrap, or may be positioned under the wrap material and held in place by the wrap material.

In one implementation of the disclosure, the reader is positioned in-line with the twine relative to a longitudinal axis of the housing. The longitudinal axis of the housing extends parallel with a direction of travel of the baler implement during operation. As such, if the identification tag is attached to or included with the twine, as the bale moves rearward during production the identification tag will move toward the reader so that the identification tag comes into range of the interrogation signal.

In one aspect of the disclosure, the reader may be configured to interrogate the interrogation tag at a distance no greater than a maximum interrogation distance. The maximum interrogation distance may be equal to or less than a maximum dimensional length of the bale. The maximum dimensional length of the bale may be measured along the longitudinal axis of the housing. In one implementation, the maximum interrogation distance is equal to or less than one half the maximum dimensional length of the bale.

In one aspect of the disclosure, the reader is a Radio Frequency Identification (RFID) reader, and the identification tag is a RFID tag. In one implementation, the RFID tag is a read only RFID tag that includes tag identification data, such as a tag ID code.

In one aspect of the disclosure, the baler implement includes a sensor for sensing a property or characteristic of the bale. The property or characteristic of the bale may include, but is not limited to, as weight of the bale, a moisture content of the crop material, a location of the bale, a material type content of the crop material, etc. As noted above, the bale identification system includes the baler implement controller. The baler implement controller has a processor and memory having a bale identification algorithm stored thereon. The processor is operable to execute the bale identification algorithm to receive data related to the bale from the sensor. The baler implement controller may control the reader to emit the interrogation signal in accordance with the pre-defined timing sequence, regardless of a position of the bale within the baling chamber or relative to the baler implement. The baler implement controller receives identification data from the identification tag in response to the interrogation signal, and associates the data related to the bale with the identification data from the identification tag of the bale. The baler implement controller may then communicate the associated data related to the bale and the identification data from the identification tag to a remote memory.

A method of identifying and tracking a bale is also provided. The method includes collecting crop material with a pick-up of a baler implement, and conveying the crop material from the pick-up into a baling chamber. The crop material is then formed into a bale having a shape within the baling chamber. The bale is wrapped with a wrap material to secure the shape of the bale. An identification tag is installed onto the bale with a tag installer. The identification tag is a radio frequency identification tag. A baler implement controller receives data from a sensor. The data is related to a characteristic of the bale. A reader continuously emits an interrogation signal in accordance with a pre-defined timing sequence. The baler implement controller receives identification data from the identification tag in response to the interrogation signal, and associates the data related to the bale with the identification data from the identification tag of the bale. The baler implement controller may then the associated data related to the bale and the identification data from the identification tag to a remote memory.

In one aspect of the method of identifying and tracking the able, the step of continuously emitting the interrogation signal from the reader in accordance with the pre-defined timing sequence includes emitting the interrogation signal in a continuous cycle regardless of a position of the bale on the baler implement. The continuous cycle includes a pre-defined scan period followed by a pre-defined non-scan period. The interrogation signal is emitted during the scan period and is not emitted during the non-scan period. Each of the scan period and the non-scan period last for a pre-defined duration of time. The sequence of the scan period followed by the non-scan period is continuously repeated in a cyclical manner to define the pre-defined timing sequence. In one implementation, the pre-defined non-scan period includes a duration of zero seconds, such that the interrogation signal is continuously emitted without interruption.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
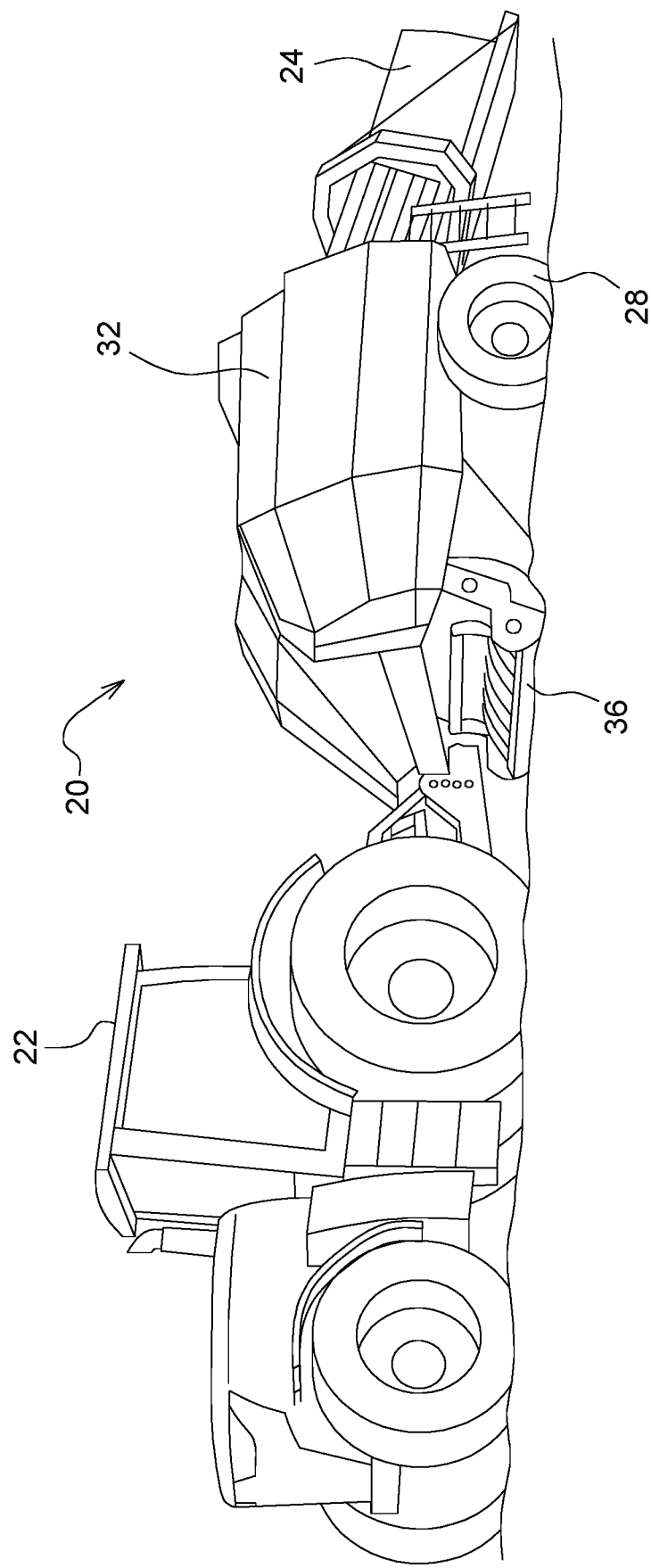
FIG. 1 is a schematic perspective view of a baler implement drawn by a tractor.
Figure 2:
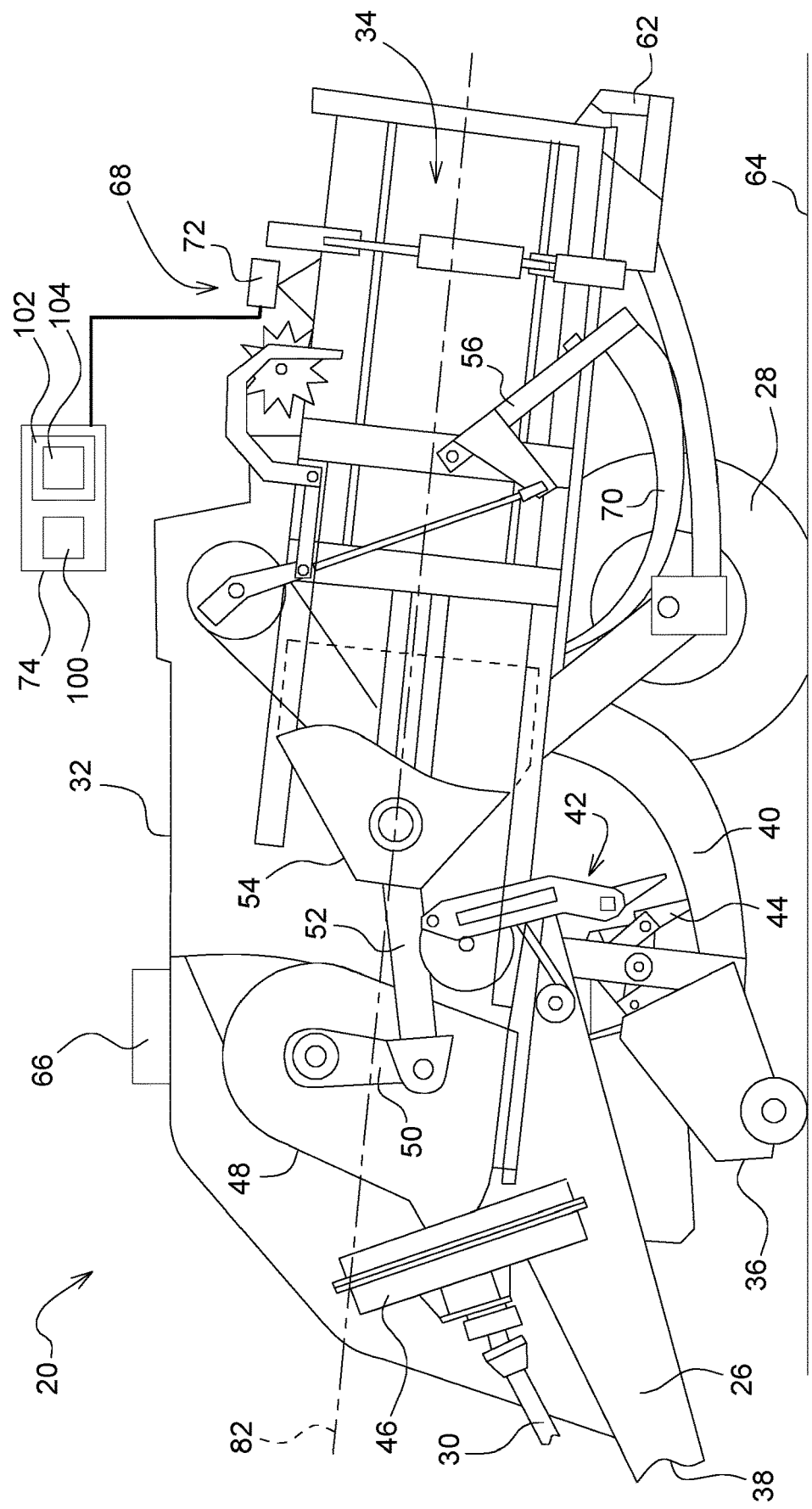
FIG. 2 is a schematic side view of the baler implement.

Referring to the Figures, wherein like numerals indicate like parts throughout the several views, a baler implement is generally shown at 20 in FIGS. 1 and 2. Referring to FIGS. 1 and 2 the baler implement 20 is shown as a large square baler. However, it should be appreciated that the teachings of this disclosure may be applied to other baler platforms, such as a round baler, and are not limited to the example implementation of the large square baler shown in the Figures and described herein.

As shown in FIG. 1, a traction unit 22 or vehicle, such as but not limited to a tractor, is coupled to the baler implement 20 for pulling and powering the baler implement 20. However, it should be appreciated that in other embodiments, the baler implement 20 may be self-propelled, in which case the traction unit 22 and the baler implement 20 are configured as a single, self-propelled vehicle.

As depicted in FIG. 1, the baler implement 20 may move across a field and gather and process crop material to form a bale 24. The baler implement 20 may then eject the formed bale 24 from the rear of the baler implement 20. In the example implementation described herein, the bale 24 includes a parallelepiped shape. However, other implementations may form the bale 24 to include a different shape, such as but not limited to a cylindrical shape.

Referring to FIG. 2, the exemplary embodiment of the baler implement 20 includes a frame 26, ground engaging devices 28, such as but not limited to wheels, and an input shaft 30, such as a power-take-off (PTO) shaft, which can receive rotational power from a power source, such as the traction unit 22.

The baler implement 20 includes a housing 32 or body, which generally shields various internal components of the baler implement 20. The housing 32 is attached to and supported by the frame 26. The housing 32 includes multiple wall sections or panels that form and/or define a baling chamber 34. The baling chamber 34 may alternatively be referred to as a compression chamber (shown in FIG. 2) for forming the bale 24.

The baler implement 20 includes a pick-up mechanism 36. The pick-up mechanism 36 is disposed proximate a forward end 38 of the frame 26. The pick-up mechanism 36 gathers crop material from the ground surface 64 and directs the gathered crop material toward and into an inlet of the baling chamber 34. The pickup mechanism may include, but is not limited to tines, forks 44, augers, conveyors, baffles, etc., for gathering and moving the crop material. The baler implement 20 may be equipped with a pre-cutter, disposed between the pickup mechanism and the inlet. As such, the pre-cutter is disposed downstream of the pickup and upstream of the inlet relative to a direction of travel of the crop material. The pre-cutter cuts or chops the crop material into smaller pieces.

In the example implementation shown in the Figures and described herein, the pick-up mechanism 36 directs the gathered crop material into a pre-compression passageway 40, which stores a volume of gathered crop material. A feeder system 42 includes a plurality of forks 44, which are timed to move the crop material from the pre-compression passageway 40, through the inlet, and into the baling chamber 34.

The input shaft 30 or PTO shaft is connected to an input of a transmission 46 to provide rotational power to the baler implement 20 from the traction unit 22 or other associated vehicle or power source. The transmission 46 includes a gearbox 48 which converts the rotational motion of the input shaft 30 along a generally longitudinal axis 82 of the baler implement 20 to an output of the transmission 46 having a rotational motion along a generally transverse axis of the baler implement 20.

The baler implement 20 includes a crank arm 50 connected to the output of the transmission 46. A connecting link 52 interconnects the crank arm 50 and a plunger 54. The crank arm 50 rotates based upon the output of the transmission 46 and the plunger 54 moves in a reciprocal motion within the compression chamber as the crank arm 50 rotates. The plunger 54 extends into the compression chamber, thereby compressing the crop material, and then at least partially retracts from the compression chamber, at which time the feeder system 42 moves more crop material into the baling chamber 34, i.e., compression chamber.

When the bale 24 is formed within the baling chamber 34, a knotter system 56 wraps a plurality of twine strands 58 around the bale 24 to secure the shape of the bale 24. When the baler implement 20 is configured as the large square baler, such as described herein, the knotter system 56 wraps the twine around a longitudinal extent or longest length of the bale 24, with each individual twine strand encircling the bale 24. The knotter system 56 ties each end of the twine of each respective twine strand together to form a knot 60, securing each respective twine strand in place.

If the baler implement 20 is configured as a round baler (not shown), then the baler implement 20 may be configured with a wrap system. The wrap system is operable to wrap the bale 24 with a wrap material inside the baling chamber 34. Once the bale 24 is formed to a desired cylindrical size, the wrap system feeds the wrap material into the baling chamber 34 to wrap the bale 24 and thereby secure the crop material in a tight package and maintain the desired shape of the bale 24. The wrap material may include, but is not limited to, a twine, a net mesh, or a solid plastic wrap.

In the example implementation shown in the figures and described herein, a completed bale 24 is pushed off a rearward end 62 of the baler implement 20 by a subsequently formed bale 24, or otherwise discharged off the rearward end 62 of the baler implement 20 by a powered roller or some other discharge mechanism, whereby the bale 24 is deposited on a ground surface 64.

The baler implement 20 may include one or more sensors 66 for sensing a property and/or characteristic of the bale 24. For example, the sensor 66 may include a Global Positioning Satellite (GPS) system sensor that is operable to determine a location of the bale 24 at the time the bale 24 is discharged from the baler implement 20, a moisture sensor operable to sense a moisture content of the bale 24, a weight sensor operable to sense or determine a weight of the bale 24, etc. The specific type, configuration, and operation of the sensor 66 is not pertinent to the teachings of this disclosure, are known to those skilled in the art, and are therefore not described in detail herein.

The baler implement 20 may further include a bale identification system 68. The bale identification system 68 identifies and tracks data related to each respective bale 24. The bale identification system 68 includes, but is not limited to, a tag installer 70, a reader 72, and a baler controller 74.

The tag installer 70 is operable to attach an identification tag 76 to the bale 24. In one implementation, the identification tag 76 includes a Radio Frequency Identification (RFID) tag, such as but not limited to a read only RFID tag. As is understood by those skilled in the art, each respective identification tag 76 is operable to provide a respective identification code 80 that is unique to that identification tag 76. As is understood by those skilled in the art, the identification tag 76 includes a radio transponder, a radio receiver, and a transmitter. In response to an electromagnetic interrogation signal 78 emitted from the reader 72, the identification tag 76 transmits digital data, such as but not limited to an identification code 80 that is unique to that specific identification tag 76. The identification tag 76 may be a passive tag that is powered by energy from the interrogation signal 78, or may include an active tag that includes a dedicated battery for powering the identification tag 76.

The tag installer 70 may include any system or device that is capable of attaching the identification tag 76 to the bale 24. In one implementation, the tag installer 70 includes the knotter system 56 using a special twine having the identification tag 76 embodied as a linear strand or filament that is woven into the twine. The twine may be marked to indicate the location of the identification tag 76 filament. The identification tag 76 is attached to the bale 24 when the knotter system 56 ties the twine to the bale 24 in the normal operation of the knotter system 56. Alternatively, the identification tag 76 may be attached to the twine, and secured to the bale 24 by the twine when the knotter system 56 ties the twine to the bale 24 in the normal operation of the knotter system 56. It should be appreciated that the tag installer 70 may differ from the example implementations described herein, and may include such other alternatives as a sticker or tag that is pinned to the bale 24, placed between flakes of the bale 24 during bale 24 formation, included with a plastic bale 24 wrap that is wrapped around the bale 24, etc.

Figure 4:
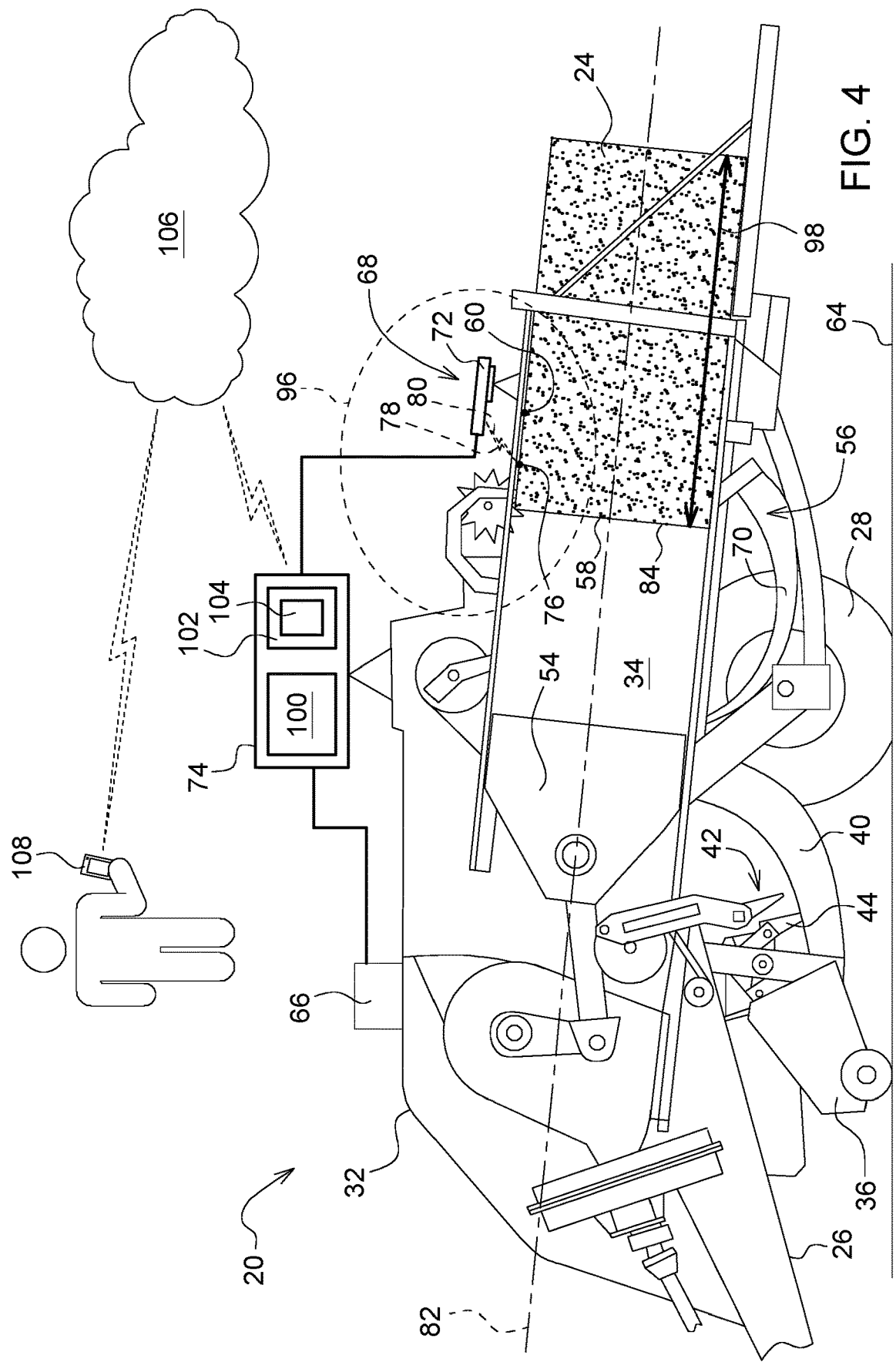
FIG. 4 is a schematic diagram of the baler implement showing the reader interrogating an identification tag and a baler implement controller communicating with a remote memory.

Referring to FIG. 4, the reader 72 is positioned to interrogate the identification tag 76. In the example implementation described herein, the reader 72 is a RFID reader 72. However, it should be appreciated that identification tag 76/reader 72 systems other than a radio frequency system may be used. The reader 72 interrogates the identification tag 76 in order to read or receive data from the identification tag 76. The data from each respective identification tag 76 relates to the identification code 80 that is unique to that respective identification tag 76. The reader 72 interrogates the identification tag 76 by emitting the interrogation signal 78. The identification tag 76 responds to the interrogation signal 78 by transmitting data related to the tag, such as but not limited to the identification code 80 of that respective identification tag 76.

Figure 3:
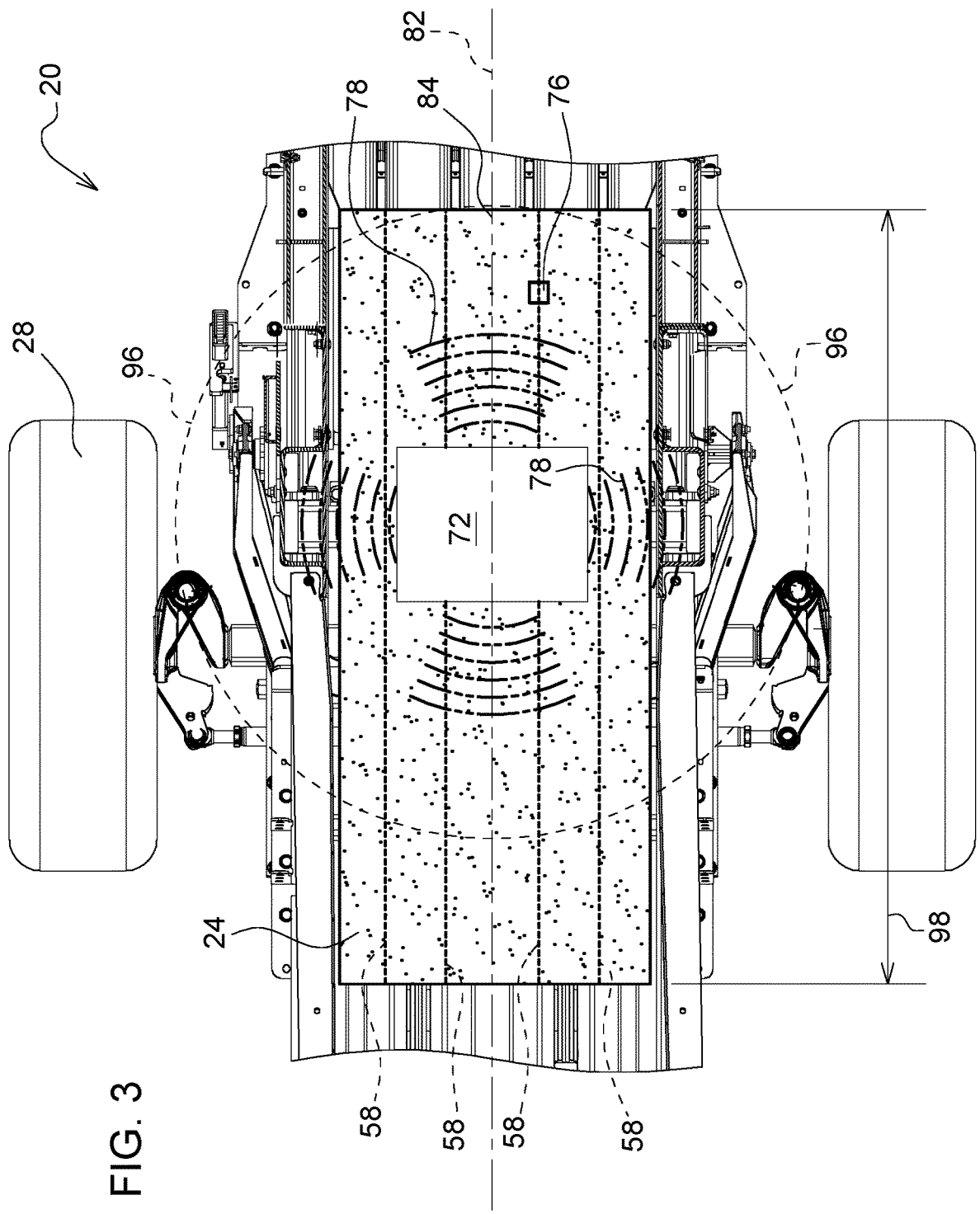
FIG. 3 is a schematic enlarged fragmentary top plan view of the baler implement showing a reader.

As described above, the reader 72 is positioned to interrogate the identification tag 76. In the example implementation described herein, with reference to FIG. 3, the reader 72 is positioned in-line with the twine relative to a longitudinal axis 82 of the housing 32. As described in greater detail below, the identification tag 76 may be installed on a specific twine band or strap, which may be referred to as an identification twine band 84. As such, the reader 72 may be positioned in-line with the identification twine band 84 relative to the longitudinal axis 82 of the housing 32, such that the identification twine band 84 passes substantially directly underneath the reader 72. Because the bale 24 is moved parallel or in-line with the longitudinal axis 82 of the housing 32 as the bale 24 is formed, secured with twine by the knotter system 56, and then discharged from the baler implement 20, the identification tag 76 moves toward and then underneath the reader 72. This positioning allows the reader 72 to be positioned closely to the identification tag 76. However, in other implementations, the reader 72 may be positioned off-line relative to the movement of the bale 24 and the associated identification tag 76.

Figure 5:
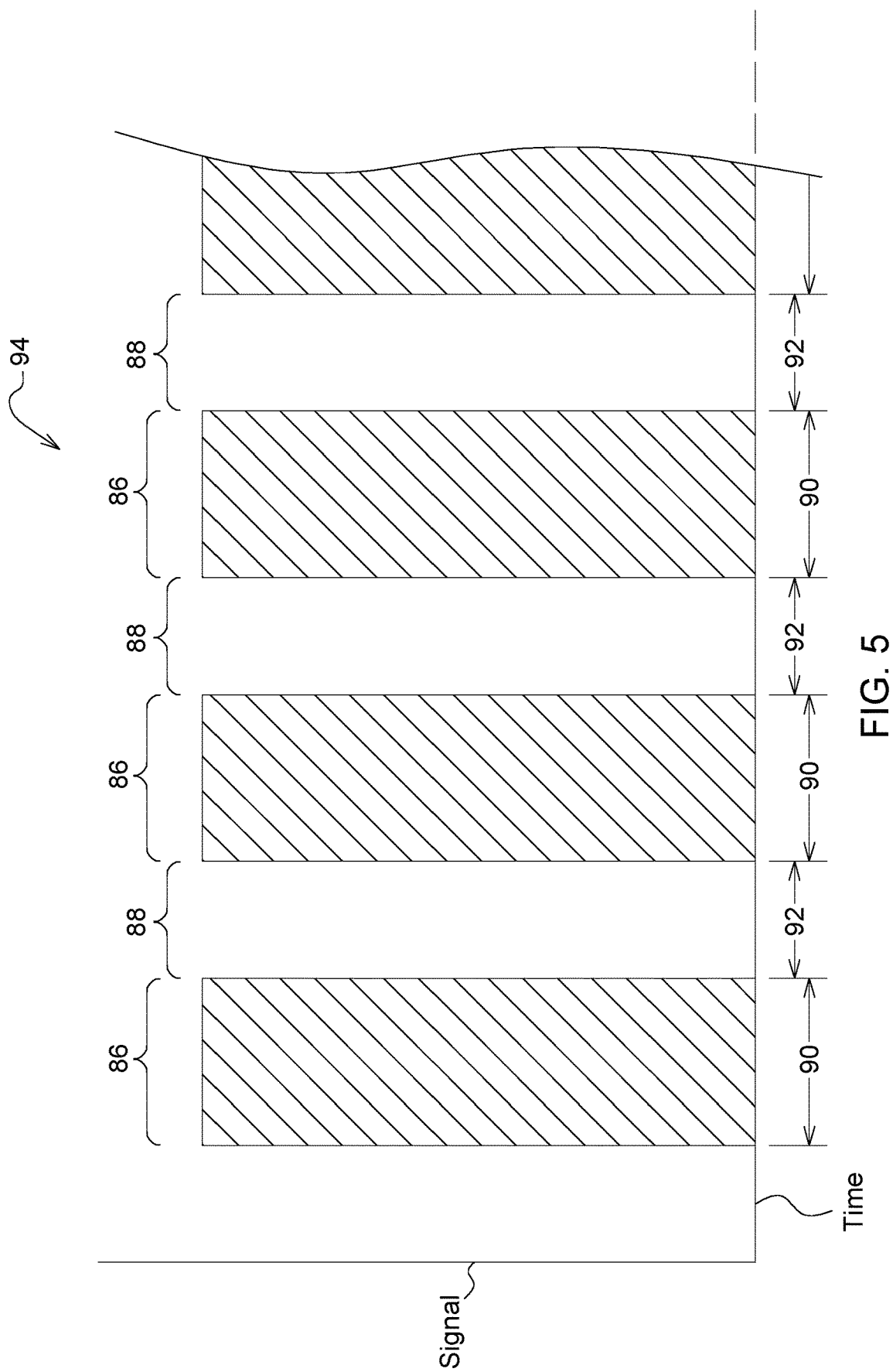
FIG. 5 is a schematic graph showing a cycle of an interrogation signal.

Referring to FIG. 5, the reader 72 emits or outputs the interrogation signal 78 in accordance with a pre-defined timing sequence. As such, the reader 72 emits the interrogation signal 78 regardless of a position of the bale 24 in the baling chamber 34, without the bale 24 activating a trigger mechanism, or without a position sensor sensing a position of the bale 24 relative to the baler implement 20. Accordingly, the reader 72 emits the interrogation signal 78 continuously following the pre-defined timing sequence, and is not dependent upon the position or movement of the bale 24 to trigger the interrogation signal 78.

The pre-defined timing sequence includes a cycle 94 that is repeated continuously. The continuous cycle 94 includes a pre-defined scan period 86 followed by a pre-defined non-scan period 88. The scan period 86 includes a period of time 90 during which the reader 72 is actively emitting the interrogation signal 78. The non-scan period 88 includes a period of time 92 during which the reader 72 is not emitting the interrogation signal 78. The scan period 86 and the non-scan period 88 are continuously repeated in sequence to define the pre-defined timing sequence.

As shown in FIG. 5, in one implementation, both the scan period 86 and the non-scan period 88 may be defined to include a duration of time that is greater than zero, in which case the interrogation signal 78 is emitted for a duration of time equal to the scan period 86 of time, and then the interrogation signal 78 is not transmitted for a duration of time equal to the non-scan period 88 of time. This provides a cyclic on/off sequence. Alternatively, the non-scan period 88 may be defined to include a duration of time that is equal to zero, in which case the scan period 86 of time is continuous and/or indefinite. In this configuration the pre-defined timing sequence includes continuously emitting the interrogation signal 78 without interruption.

Referring to FIG. 4, the reader 72 may be configured to interrogate the interrogation tag, i.e., communicate with the identification tag 76, at a distance no greater than a maximum interrogation distance 96. In other words, the reader 72 may be configured to a maximum distance, i.e., the maximum interrogation distance 96, at which the reader 72 may transmit and communicate the interrogation signal 78 and/or at which the identification tag 76 may receive the interrogation signal 78. As such, the reader 72 is unable to communicate with the identification tag 76 when the identification tag 76 is located beyond the maximum interrogation distance 96. In one implementation, the maximum interrogation distance 96 is equal to or less than a maximum dimensional length 98 of the bale 24 measured along the longitudinal axis 82 of the housing 32. In another implementation, the maximum interrogation distance 96 may be defined to be equal to or less than one half the maximum dimensional length 98 of the bale 24 measured along the longitudinal axis 82 of the housing 32. It should be appreciated that the maximum interrogation distance 96 may be defined to equal some other value, and may be defined to equal a value that prevents the reader 72 from communicating with more than one identification tag 76 at a time. In other words, if the maximum interrogation distance 96 is set so that, because of the dimensions of the bale 24, only one identification tag 76 may be located within the maximum interrogation distance 96 at any point in time, then the reader 72 may only communicate with one identification tag 76.

As shown in FIG. 4, the maximum dimensional length 98 of the bale 24 is the maximum length of the bale 24 relative to the longitudinal axis 82 of the housing 32. If the baler implement 20 is configured as a large square baler, such as shown in the Figures and described herein, the maximum dimensional length 98 of the bale 24 is the length between the two end faces of the bale 24 that extend transverse to the longitudinal axis 82 of the housing 32. However, if the baler implement 20 is configured as a conventional round baler, in which the bale 24 is formed with a center of the cylindrical shape extending transverse to the longitudinal axis 82 of the round baler, then the maximum dimension length of the bale 24 would be the diameter of the cylindrical shaped bale 24.

As described above, with reference to FIG. 4, the bale identification system 68 includes the baler controller 74. The baler controller 74 is disposed in communication with the sensor 66(*s*) and the reader 72. The baler controller 74 is operable to receive data from the sensor 66(*s*), control the operation of the reader 72, and receive a signal or data from the identification tag 76. While the baler controller 74 is generally described herein as a singular device, it should be appreciated that the baler controller 74 may include multiple devices linked together to share and/or communicate information therebetween. Furthermore, it should be appreciated that the baler controller 74 may be located on the baler implement 20 or located remotely from the baler implement 20.

The baler controller 74 may alternatively be referred to as a computing device, a computer, a controller, a control unit, a control module, a module, etc. The baler controller 74 includes a processor 100, a memory 102, and all software, hardware, algorithms, connections, sensors 66, etc., necessary to manage and control the operation of the reader 72. As such, a method may be embodied as a program or algorithm operable on the baler controller 74. It should be appreciated that the baler controller 74 may include any device capable of analyzing data from various sensors 66, comparing data, making decisions, and executing the required tasks.

As used herein, "controller" is intended to be used consistent with how the term is used by a person of skill in the art, and refers to a computing component with processing, memory 102, and communication capabilities, which is utilized to execute instructions (i.e., stored on the memory 102 or received via the communication capabilities) to control or communicate with one or more other components. In certain embodiments, the baler controller 74 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 74 may be in communication with other components on the baler implement 20, such as hydraulic components, electrical components, and operator inputs within an operator station of an associated work vehicle. The baler controller 74 may be electrically connected to these other components by a wiring harness such that messages, commands, and electrical power may be transmitted between the baler controller 74 and the other components. Although the baler controller 74 is referenced in the singular, in alternative embodiments the configuration and functionality described herein can be split across multiple devices using techniques known to a person of ordinary skill in the art.

The baler controller 74 may be embodied as one or multiple digital computers or host machines each having one or more processor 100*s*, read only memory 102 (ROM), random access memory 102 (RAM), electrically-programmable read only memory 102 (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 102 may include any non-transitory/tangible medium which participates in providing data or computer-readable instructions. The memory 102 may be non-volatile or volatile. Non-volatile media may include, for example, optical or magnetic disks and other persistent memory 102. Example volatile media may include dynamic random access memory 102 (DRAM), which may constitute a main memory 102. Other examples of embodiments for memory 102 include a floppy, flexible disk, or hard disk, magnetic tape or other magnetic medium, a CD-ROM, DVD, and/or any other optical medium, as well as other possible memory 102 devices such as flash memory 102.

The baler controller 74 includes the tangible, non-transitory memory 102 on which are recorded computer-executable instructions, including a bale identification algorithm 104. The processor 100 of the baler controller 74 is configured for executing the bale identification algorithm 104. The bale identification algorithm 104 implements a method of identifying and tracking the bale 24 of material, described in detail below.

The method of identifying and tracking the bale 24 includes collecting the crop material with the pick-up mechanism 36 of the baler implement 20, conveying the crop material from the pick-up mechanism 36 into the baling chamber 34, and then forming the crop material into the bale 24 within the baling chamber 34. The formed bale 24 may then be wrapped with a wrap material, such as but not limited to twine, to secure the shape of the bale 24. The general procedure and processes used to form and secure the bale 24 within the baler implement 20 are dependent upon the specific configuration of the baler implement 20, are known to those skilled in the art, and are therefore not described in greater detail herein.

The identification tag 76 is installed onto the bale 24 with the tag installer 70. In the example implementation described herein, the identification tag 76 is a RFID tag that is integrated into a filament of one of the bands of twine securing the bale 24. The specific band of twine including the identification tag 76 may be referred to as the identification band. In the example implementation described herein, the identification tag 76 is installed by the knotter system 56 when the knotter system 56 wraps the bale 24 with the twine having the identification tag 76 filament. It should be appreciated that the identification tag 76 may be installed differently than the example implementation described herein.

The baler controller 74 receives data from the sensor 66 related to a property or characteristic of the bale 24. The property of the bale 24 sensed by the sensor 66 may include, but is not limited to, a location of the bale 24 when discharged from the baler implement 20 a moisture content of the bail, a constituent content list of the crop material forming the bale 24, a weight of the bale 24, etc.

The reader 72 is controlled to emit the interrogation signal 78 in accordance with the pre-defined timing sequence. As described above, the reader 72 emits the interrogation signal 78 regardless of a position of the bale 24 within the baling chamber 34, or relative to the baler implement 20. Additionally, the reader 72 emits the interrogation signal 78 without being triggered by another system of the baler implement 20, such as a bale 24 drop indicator, a star wheel, a bale 24 position sensor 66, etc.

As described above, the pre-defined timing sequence may include the cycle 94 that is repeated continuously. The continuous cycle 94 includes the pre-defined scan period 86 followed by the pre-defined non-scan period 88. The scan period 86 includes the period of time 90 during which the reader 72 is actively emitting the interrogation signal 78. The non-scan period 88 includes the period of time 92 during which the reader 72 is not emitting the interrogation signal 78. The scan period 86 and the non-scan period 88 are continuously repeated in sequence to define the pre-defined timing sequence. In one implementation, both the scan period 86 and the non-scan period 88 may be defined to include a duration of time that is greater than zero, in which case the interrogation signal 78 is emitted for a duration of time equal to the scan period 86 of time, and then the interrogation signal 78 is not transmitted for a duration of time equal to the non-scan period 88 of time. This provides a cyclic on/off sequence. Alternatively, the non-scan period 88 may be defined to include a duration of time that is equal to zero, in which case the scan period 86 of time is continuous and/or indefinite. In this configuration the pre-defined timing sequence includes continuously emitting the interrogation signal 78 without interruption.

In response to the interrogation signal 78, the baler controller 74 may receive an identification code 80, i.e., identification data, from the identification tag 76. As described above, the reader 72 may be configured so that the interrogation signal 78 may only be received or communicated to the identification tag 76 when the identification tag 76 is within the maximum interrogation distance 96. In other words, if the identification tag 76 is farther away from the reader 72 than the maximum interrogation distance 96, then the identification tag 76 will not transmit the identification code 80 to the reader 72. However, once the bale 24 moves along the longitudinal axis 82 of the baler implement 20 to within the maximum interrogation distance 96, then the identification tag 76 will receive the interrogation signal 78, and respond by transmitting the identification code 80 to the reader 72.

When the reader 72 receives the identification code 80 from the identification tag 76, the reader 72 communicates the identification code 80 to the baler controller 74. The baler controller 74 may then associate the data related to the bale 24 with the identification data from the identification tag 76 of the bale 24, i.e., the identification code 80. The baler controller 74 may then communicate the associated data related to the bale 24 and the identification data from the identification tag 76 to a remote memory 106. The remote memory 106 may include Cloud based storage, or some third party storage facility capable of storing electronic data.

Once the data related to the bale 24 and the unique identification code 80 from the identification tag 76 are associated together and stored in the remote memory 106, an operator may scan the identification tag 76 on the bale 24 with a second reader 108, e.g., a handheld RFID reader 72, to obtain the unique identification code 80 for that specific bale 24. The operator may then query the remote memory 106 using the identification code 80 from the bale 24, and obtain the data related to that bale 24 that is associated with the identification code 80 of the identification tag 76 on that bale 24.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement comprising:
    a housing defining a baling chamber for forming crop material into a bale;
    a tag installer operable to attach an identification tag to the bale;
    a reader positioned to interrogate the identification tag for receiving data from the identification tag, wherein the reader is operable to emit an interrogation signal in accordance with a pre-defined timing sequence; and
    wherein the reader emits the interrogation signal regardless of a position of the bale in the baling chamber.

2. The baler implement set forth in claim 1, wherein the pre-defined timing sequence includes continuously emitting the interrogation signal.

3. The baler implement set forth in claim 1, wherein the pre-defined timing sequence includes emitting the interrogation signal in a continuous cycle, wherein the continuous cycle includes a pre-defined scan period followed by a pre-defined non-scan period.

4. The baler implement set forth in claim 1, wherein the tag installer includes a knotter system operable to wrap the bale with a twine, wherein the identification tag is attached to the twine.

5. The baler implement set forth in claim 4, wherein the reader is positioned in-line with the twine relative to a longitudinal axis of the housing.

6. The baler implement set forth in claim 1, wherein the reader is a radio frequency identification reader, and the identification tag is a read only radio frequency identification tag.

7. The baler implement set forth in claim 1, further comprising a sensor for sensing a property of the bale, and a baler implement controller having a processor and memory having a bale identification algorithm stored thereon, wherein the processor is operable to execute the bale identification algorithm to:
    receive data related to the bale from the sensor;
    control the reader to emit the interrogation signal in accordance with the pre-defined timing sequence regardless of a position of the bale within the baling chamber;
    receive identification data from the identification tag in response to the interrogation signal;
    associate the data related to the bale with the identification data from the identification tag of the bale; and
    communicate the associated data related to the bale and the identification data from the identification tag to a remote memory.

8. A baler implement comprising:
    a housing defining a baling chamber for forming crop material into a bale;
    a tag installer operable to attach an identification tag to the bale;
    a reader positioned to interrogate the identification tag for receiving data from the identification tag, wherein the reader is operable to emit an interrogation signal in accordance with a pre-defined timing sequence; and
    wherein the reader is configured to interrogate the interrogation tag at a distance no greater than a maximum interrogation distance, wherein the maximum interrogation distance is equal to or less than a maximum dimensional length of the bale measured along a longitudinal axis of the housing.

9. The baler implement set forth in claim 8, wherein the maximum interrogation distance is equal to or less than one half the maximum dimensional length of the bale.

10. A bale identification system for a baler implement, the bale identification system comprising:
    a tag installer operable to attach an identification tag to a bale;
    a reader positioned to interrogate the identification tag for receiving data from the identification tag;
    a baler implement controller in communication with the reader and having a processor and memory having a bale identification algorithm stored thereon, wherein the processor is operable to execute the bale identification algorithm to:
    receive data related to the bale from a sensor;
    control the reader to emit an interrogation signal in accordance with a pre-defined timing sequence regardless of a position of the bale on the baler implement;
    receive identification data from the identification tag in response to the interrogation signal;
    associate the data related to the bale with the identification data from the identification tag of the bale; and
    communicate the associated data related to the bale and the identification data from the identification tag to a remote memory.

11. The bale identification system set forth in claim 10, wherein the pre-defined timing sequence includes continuously emitting the interrogation signal.

12. The bale identification system set forth in claim 10, wherein the pre-defined timing sequence includes emitting the interrogation signal in a continuous cycle, wherein the continuous cycle includes a pre-defined scan period followed by a pre-defined non-scan period.

13. The bale identification system set forth in claim 10, wherein the tag installer includes a knotter system operable to wrap the bale with a twine including the identification tag.

14. The bale identification system set forth in claim 13, wherein the reader is positioned in-line with the twine relative to a longitudinal axis of the baler implement,
    wherein continuously emitting the interrogation signal from the reader in accordance with the pre-defined timing sequence is further defined as emitting the interrogation signal in a continuous cycle regardless of a position of the bale on the baler implement, wherein the continuous cycle includes a pre-defined scan period followed by a pre-defined non-scan period.

15. The bale identification system set forth in claim 10, wherein the reader is configured to interrogate the interrogation tag at a distance no greater than a maximum interrogation distance, wherein the maximum interrogation distance is equal to or less than a maximum dimensional length of the bale.

16. The bale identification system set forth in claim 15, wherein the maximum interrogation distance is equal to or less than one half the maximum dimensional length of the bale.

17. The bale identification system set forth in claim 10, wherein the reader is a radio frequency identification reader, and the identification tag is a radio frequency identification tag.

18. A method of identifying and tracking a bale, the method comprising:
- collecting crop material with a pick-up of a baler implement;
- conveying the crop material from the pick-up into a baling chamber;
- forming the crop material into a bale having a shape within the baling chamber;
- wrapping the bale with a wrap material to secure the shape of the bale;
- installing an identification tag onto the bale with a tag installer, wherein the identification tag is a radio frequency identification tag;
- receiving data from a sensor, with a baler implement controller, wherein the data is related to a characteristic of the bale;
- continuously emitting an interrogation signal from a reader in accordance with a pre-defined timing sequence;
- receiving identification data from the identification tag, with the baler implement controller, in response to the interrogation signal;
- associating, with the baler implement controller, the data related to the bale with the identification data from the identification tag of the bale; an
- communicating, with the baler implement controller, the associated data related to the bale and the identification data from the identification tag to a remote memory.

* * * * *